US009964682B2

(12) United States Patent
Liu et al.

(10) Patent No.: US 9,964,682 B2
(45) Date of Patent: *May 8, 2018

(54) LIGHT SOURCE MODULE AND DISPLAY APPARATUS

(71) Applicant: Young Lighting Technology Inc., Hsin-Chu (TW)

(72) Inventors: Chin-Ku Liu, Hsin-Chu (TW); Jhong-Hao Wu, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/365,955

(22) Filed: Dec. 1, 2016

(65) Prior Publication Data
US 2017/0160459 A1 Jun. 8, 2017

(30) Foreign Application Priority Data

Dec. 4, 2015 (TW) .................................. 104140683

(51) Int. Cl.
*F21V 8/00* (2006.01)
(52) U.S. Cl.
CPC ........... *G02B 6/0026* (2013.01); *G02B 6/003* (2013.01); *G02B 6/0046* (2013.01)
(58) Field of Classification Search
CPC .... G02B 6/0026; G02B 6/003; G02B 6/0046; G02B 6/0013; G02B 6/0016; G02B 6/0023; G02B 6/0031
USPC ................. 362/608, 609, 612, 613, 615–629
See application file for complete search history.

(56) References Cited

U.S. PATENT DOCUMENTS

| 7,218,830 | B2 * | 5/2007 | Iimura | G02B 6/0018 362/610 |
|---|---|---|---|---|
| 7,481,566 | B2 * | 1/2009 | Han | G02B 6/0025 362/342 |
| 8,827,530 | B2 * | 9/2014 | Chang | G02B 6/0028 362/608 |
| 2004/0130880 | A1 | 7/2004 | Min et al. | |
| 2006/0109684 | A1 * | 5/2006 | Nesterenko | G02B 6/0018 362/610 |
| 2008/0055928 | A1 * | 3/2008 | Arai | G02B 6/0016 362/609 |
| 2013/0028558 | A1 | 1/2013 | Jenkins | |

(Continued)

FOREIGN PATENT DOCUMENTS

CN 102011981 6/2012
CN 104180241 12/2014
(Continued)

*Primary Examiner* — Laura Tso
(74) *Attorney, Agent, or Firm* — JCIPRNET

(57) ABSTRACT

A light source module including a light guide plate, a light source set and a light modulating device is provided. The light guide plate includes a light entering surface. The light source set is disposed beside the light entering surface. The light source set is adapted to emit a first light beam. The light modulating device is disposed between the lightsource set and the light guide plate. The light modulating device includes a light filtering portion. The first light enters the light entering surface through the light modulating device, and the light modulating device makes a divergence angle of the first light converge.

19 Claims, 12 Drawing Sheets

(56) References Cited

U.S. PATENT DOCUMENTS

| | | | |
|---|---|---|---|
| 2013/0271700 A1* | 10/2013 | Nakamura | G02B 6/0026 349/65 |
| 2014/0286044 A1 | 9/2014 | Johnson et al. | |
| 2015/0355400 A1* | 12/2015 | Li | G02F 1/133608 349/62 |
| 2017/0160461 A1 | 6/2017 | Liu et al. | |

FOREIGN PATENT DOCUMENTS

| | | |
|---|---|---|
| TW | 201213965 | 4/2012 |
| TW | 201232126 | 8/2012 |
| TW | 201312226 | 3/2013 |
| TW | 201331646 | 8/2013 |
| TW | 201411248 | 3/2014 |
| TW | 201516492 | 2/2015 |

* cited by examiner

LIGHT SOURCE MODULE AND DISPLAY APPARATUS

CROSS-REFERENCE TO RELATED APPLICATION

This application claims the priority benefit of Taiwan application serial no. 104140683, filed on Dec. 4, 2015. The entirety of the above-mentioned patent application is hereby incorporated by reference herein and made a part of this specification.

BACKGROUND OF THE INVENTION

Field of the Invention

The invention relates to a light source module and a display apparatus.

Description of Related Art

Liquid crystal display (LCD) has been broadly applied in various aspects of our daily life, such as being applied in informational household appliances including notebook personal computers, liquid crystal monitors, portable consumer audio-video products, mobile phones, and liquid crystal TVs, etc. Since the display panel in a liquid crystal display does not emit light, the light source module that provides light is a key component of the liquid crystal display.

In relevant research on displays in recent years, the anti-spy function of displays becomes more and more important. Since users hope that, when using relevant products, the individual privacy may also be protected, more and more people add an anti-spy function to their screens. Also, the products suitable for adding the anti-spy capability expand further from notebook personal computers and liquid crystal monitors to portable consumer audio-video products, such as mobile phones and tablets, etc. Currently, the main stream of the anti-spy design is to add an anti-spy film to shield a large angular beam, so as to prevent others from viewing. However, such anti-spy film makes the brightness in the front perspective lower and reduces the display sharpness. Also, the user must carry the anti-spy film all the time, making it inconvenient to use. Alternatively, some technologies utilize the spirality of twist nematic (TN) liquid crystal in different blocks of the screen, such that the viewer may perceive different brightness at different angles, thereby accomplishing the effect of anti-spy. However, controlling the liquid crystal molecules to have different inclination angles in different display areas make the manufacturing process more difficult. Another alternative is to utilize the optical properties of the vertically aligned (VA) liquid crystal to produce a designed anti-spy pattern on the mobile phone to interfere others' viewing. However, such technology makes the brightness of the mobile phone lower, and the designed anti-spy pattern is unable to completely shield the contents being displayed. Thus, the anti-spy effect of the display is not desirable.

The information disclosed in the "BACKGROUND OF THE INVENTION" section is only for enhancement of understanding of the background of the described technology, and therefore it may contain information that does not form the prior art that is already known to a person of ordinary skill in the art. Further, the information disclosed in the "BACKGROUND OF THE INVENTION" section does not mean that one or more problems to be resolved by one or more embodiments of the invention was acknowledged by a person of ordinary skill in the art.

SUMMARY OF THE INVENTION

The invention provides a light source module. Light emitted by the light source module has a smaller divergence angle, so as to provide an anti-spy effect to a display apparatus.

The invention provides a display apparatus having an anti-spy effect.

Other objects and advantages of the present invention can be further illustrated by the technical features broadly embodied and described as follows.

In order to achieve one or a portion of or all of the objects or other objects, one embodiment of the invention provides a light source module. The light source module includes a light guide plate, a light source set, and a light modulating device. The light guide plate includes a light entering surface. The light source set is disposed beside the light entering surface. The light source set is adapted to emit a first light beam. The light modulating device is disposed between the light source set and the light guide plate. The light modulating device includes a light filtering portion. The first light beam passes through the light modulating device and enters the light entering surface, and the light modulating device makes a divergence angle of the first light beam converge.

In order to achieve one or a portion of or all of the objects or other objects, one embodiment of the invention provides a display apparatus. The display apparatus includes a display panel and a light source module. The light source module is adapted to provide the light beam to the display panel. The light source module includes a light guide plate, a light source set, and a light modulating device. The light guide plate includes a light entering surface. The light source set is disposed beside the light entering surface. The light source set is adapted to emit a first light beam. The light modulating device is disposed between the light source set and the light guide plate. The light modulating device includes a light filtering portion. The first light beam passes through the light modulating device and enters the light entering surface, and the light modulating device makes a divergence angle of the first light beam converge.

Based on above, the embodiments of the invention at least have one of the following characteristics or effects. In the light source module and the display apparatus according to the embodiments of the invention, the light modulating device includes the light filtering portion. The first light beam emitted by the light source set enters the light entering surface of the light guide plate through the light modulating device, and the light modulating device makes the divergence angle of the first light converge. Thus, the light source module according to the embodiments of the invention provides the anti-spy effect to a display apparatus.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
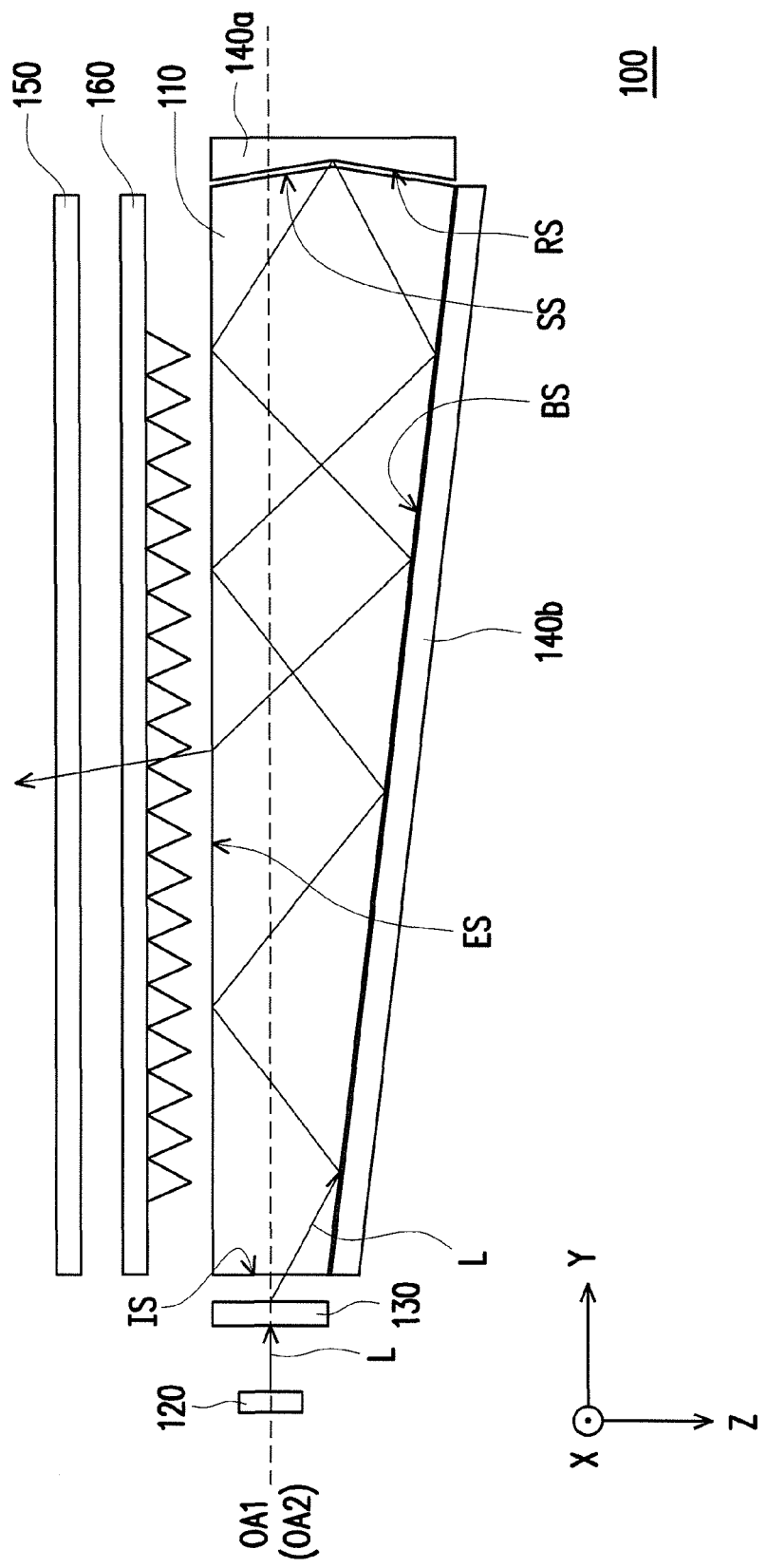
FIG. 1A is a schematic cross-sectional side view illustrating a light source module according to an embodiment of the invention.

FIG. 1A is a schematic cross-sectional side view illustrating a light source module according to an embodiment of the invention. Referring to FIG. 1, in this embodiment, a light source module 100 includes a light guide plate 110, a light source set 120, and a light modulating device 130. The light guide plate 110 includes a light entering surface IS. The light source set 120 is disposed beside the light entering surface IS. The light modulating device 130 is disposed between the light source set 120 and the light guide plate 110. Specifically, the light guide plate 110 further includes a light emitting surface ES, a bottom surface BS opposite to the light emitting surface ES, and a side surface SS opposite to the light entering surface IS. The light entering surface IS is disposed between the light emitting surface ES and the bottom surface BS, and the light entering surface IS is connected to the light emitting surface ES and the bottom surface BS. The side surface SS is located between the light emitting surface ES and the bottom surface BS, and the side surface SS is connected to the light emitting surface ES and the bottom surface BS. In this embodiment, the light guide plate 110 is a reflective wedge light guide plate, for example. A thickness of the light guide plate 110 gradually decreases from the side surface SS toward the light entering surface IS, for example. In other embodiments, the light guide plate 110 may also be a light guide plate disposing a micro-structure on the bottom surface BS or other types of light guide plates, for example. The invention does not intend to impose a limitation in this regard.

Figure 1B:
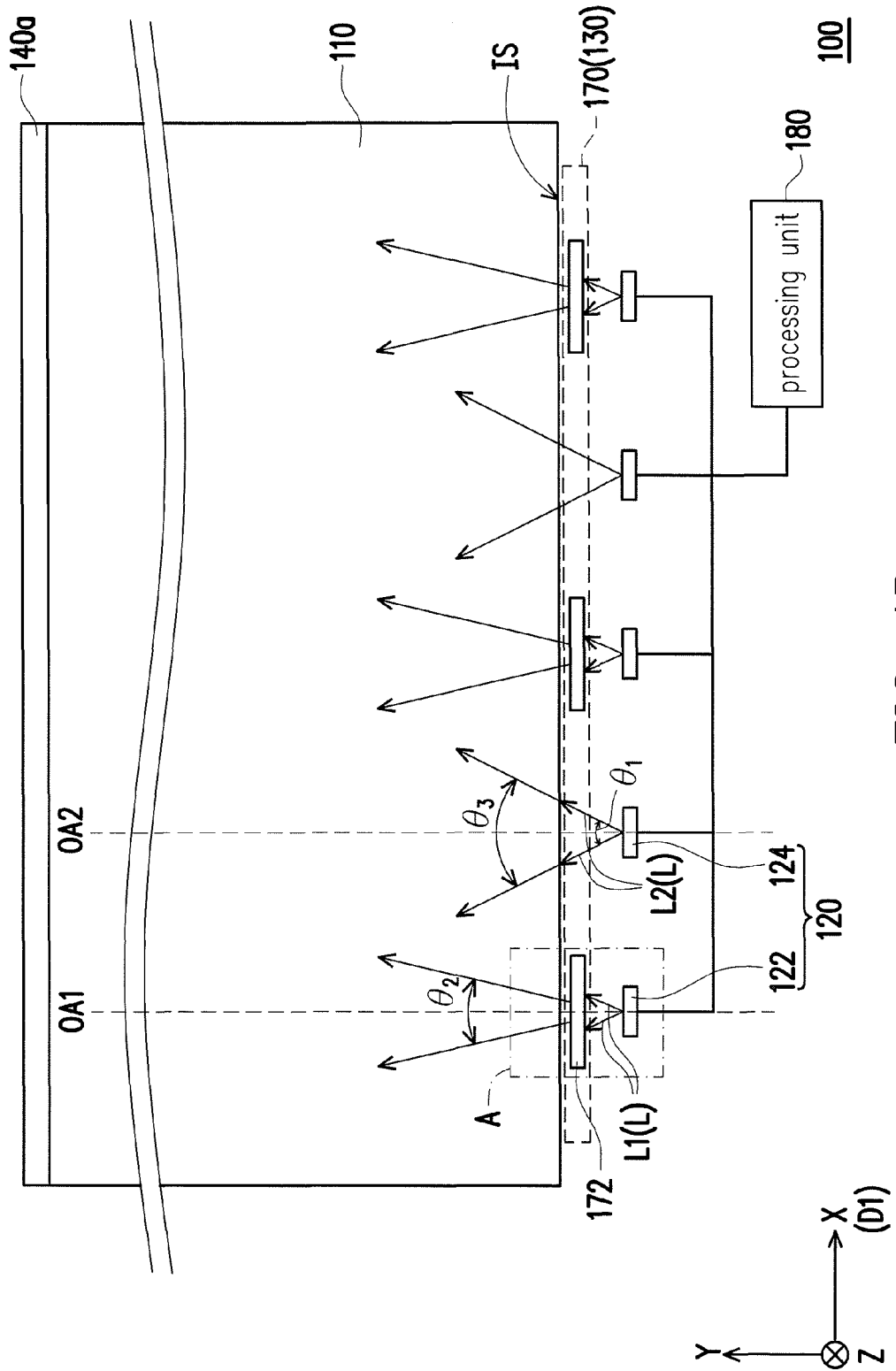
FIG. 1B is a schematic cross-sectional top view illustrating the light source module of the embodiment shown in FIG. 1A.

FIG. 1B is a schematic cross-sectional top view illustrating the light source module of the embodiment shown in FIG. 1A. Referring to FIG. 1A, in this embodiment, the light source module 100 further includes a reflection device 140a, a reflection device 140b, a diffusion sheet 150, and a prism sheet 160. The light source set 120 and the reflection device 140a are disposed at opposite sides of the light guide plate 110, and the reflection device 140a includes a reflection surface RS facing the light guide plate 110. More specifically, a shape of the reflection surface RS corresponds to a shape of a profile of the side surface SS of the light guide plate 110. For example, in this embodiment, the shape of the side surface SS of the light guide plate 110 is a trigonal plane, and the shape of the reflection surface RS corresponds to the profile of the side surface SS of the light guide plate 110 to exhibit a recessed shape. In this embodiment, the prism 160 is disposed at the side of the light emitting surface ES of the light guide plate 110, and a surface of the prism sheet 160 where a prism is provided faces the light emitting surface ES. In addition, the prism sheet 160 is disposed between the light guide plate 110 and the diffusion sheet 150, and the reflection device 140b is disposed at a side of the bottom surface BS of the light guide plate 110. In this embodiment, the reflection device 140b is a white reflection sheet, a mirror reflection sheet, or other types of reflection sheets. However, the invention is not limited thereto. Specifically, the light source set 120 includes at least one first light source 122 and at least one second light source 124. The first light source 122 and the second light source 124 respectively have an optical axis OA1 and an optical axis OA2 parallel to each other. The light source module 100 is located in a space built with a first axis X, a second axis Y, and a third axis Z. In addition, a direction of the second axis Y is parallel with the optical axis OA1 of the first light source 122 and parallel with the optical axis OA2 of the second light source 124. A direction of the first axis X extends along a horizontal direction. A direction of the second axis Y is perpendicular to the direction of the first axis X and extends along the perpendicular direction. Moreover, a direction of the third axis Z is perpendicular to the direction of the first axis X and the direction of the second axis Y. The first light source 122 and the second light source 124 are alternately arranged along the direction of the first axis X. The first light source 122 and the second light source 124 are light emitting diodes (LEDs), for example. In other embodiments, organic light emitting diodes (OLEDs) or other types of light emitting devices may also be used based on the optical requirement of the light source module 100. The invention does not intend to impose any limitation in this regard.

In this embodiment, the light source set 120 is suitable to emit a light beam L, and the light beam L passes through the light modulating device 130 and enters the light entering surface IS. An incident angle of most of the light beam L entering the light entering surface ES and the bottom surface BS is greater than a critical angle, so as to be transmitted to the side surface SS of the light guide plate 110 through total reflection. Then, the light beam L is reflected on the reflection surface RS of the reflection device 140a to return the light guide plate 110 from the side surface SS. Since the thickness of the light guide plate 110 of this embodiment gradually decreases from the side surface SS toward the light entering surface IS, the incident angle of the light beam L returning from the side surface SS and entering the light emitting surface ES or the bottom surface BS may gradually decrease as the number of times that the light beam L is reflected by the light emitting surface ES and the bottom surface BS increases. When the incident angle of the light beam L at the light emitting surface ES is smaller than the critical angle, the light beam L may be refracted out of the light guide plate 110 at the light emitting surface ES. In addition, since the reflection device 140b is disposed at a side of the bottom surface BS of the light guide plate 110, even if the incident angle of the light beam L at the bottom surface BS is smaller than the critical angle, the light beam L may still be reflected to the light emitting surface ES through the reflection device 140b. Specifically, due to the structural design of the light guide plate, a divergence angle of the light beam L entering the light entering surface IS in the horizontal direction (in the direction of the first axis X) is close to the divergence angle of the light beam L leaving the light emitting surface ES in the horizontal direction.

In this embodiment, the diffusion sheet 150 and the prism sheet 160 are respectively used to increase an illuminating uniformity and an illuminating brightness of the light beam L, such that the light source module 100 has a preferable optical effect. Specifically, based on the optical requirement, the light source 100 may also include other types of optical films, so as to make proper optical adjustment to the light beam L. The invention does not intend to impose any limitation in this regard.

Figure 1C:
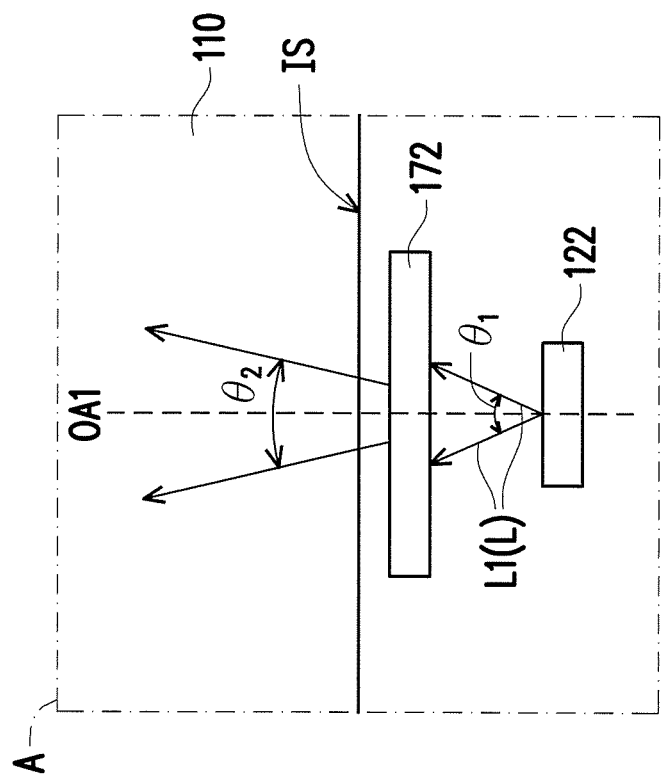
FIG. 1C is an enlarged schematic view of an area A of the light source module of the embodiment shown in FIG. 1B
Figure 1D:
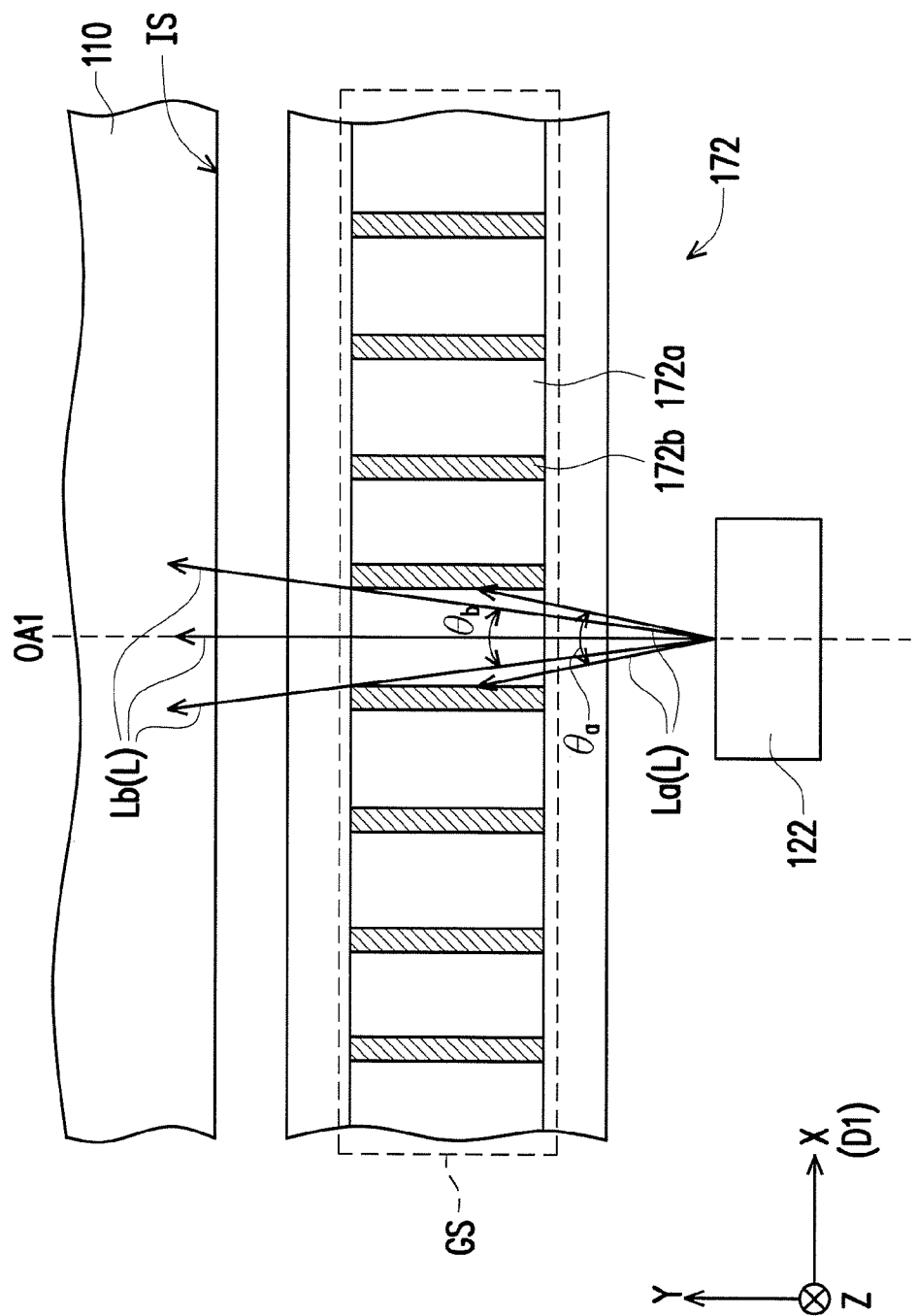
FIG. 1D is a schematic view illustrating a first light filtering device of the light source module of the embodiment shown in FIG. 1A absorbing a large angular beam.

FIG. 1C is an enlarged schematic view of an area A of the light source module of the embodiment shown in FIG. 1B, and FIG. 1D is a schematic view illustrating a first light filtering device of the light source module of the embodiment shown in FIG. 1A absorbing a large angular beam. Referring to FIG. 1B, in this embodiment, the light beam L includes a first light beam L1 and a second light beam L2. The first light source 122 is adapted to emit the first light beam L1, and the second light source 124 is adapted to emit the second light beam L2. The light modulating device 130 includes a light filtering portion 170, and the light filtering portion 170 includes at least one first light filtering device 172. Specifically, the light modulating device 130 is disposed in correspondence with the first light source 122. The first light beam L1 emitted by the first light source 122 of the light source set 120 passes through the light filtering portion 170 of the light modulating device 130 to enter the light entering surface IS of the light guide plate 110, and the light modulating device 130 makes a divergence angle of the first light beam L1 converge. In addition, the second light beam L2 directly enters the light entering surface IS after leaving the second light source 124.

Referring to FIG. 1C and FIG. 1D, in this embodiment, the first light filtering device 172 of the light filtering portion 170 absorbs a portion of the first light beam L1 whose divergence angle $\theta_1$ is greater than a first angle to make the divergence angle $\theta_1$ of the first light beam L1 converge. Referring to FIG. 1D, which is a schematic view illustrating that the first filtering device 172 absorbs a large angular beam, in this embodiment, the first light filtering device 172 is a grating structure GS, and the grating structure GS includes a plurality of light absorbing units 172b disposed intermittently along the first direction D1 and in parallel. In addition, the first direction D1 is parallel to the first axis X and the first direction D1 is perpendicular to a direction of the optical axis OA1. A material of the light absorbing units 172b includes a light absorbing material, such as black resin or dark ink, etc. Specifically, the grating structure GS further includes a plurality of light transmissive units 172a, and the light transmissive units 172a and the light absorbing units 172b are alternately arranged along the first direction D1. In other embodiments, the grating structure GS includes a plurality of light reflecting units and the light transmissive units 172a alternately arranged along the first direction D1. A material of the light reflecting units includes a light absorbing material, such as white resin or a metal material, etc. The light absorbing unit mentioned in all the embodiments of the specification may be replaced with the light reflecting unit, and the difference only lies in absorption or reflection of light. However, both the light absorbing unit and the light reflecting unit in the embodiments of the invention are able to make the divergence angle of a light beam converge. Details in this respect are thus not repeated in the following.

Referring to FIG. 1D, in this embodiment, the light beam L emitted by the first light source 122 passes through the first light filtering device 172 and enters the light entering surface IS of the light guide plate 110. When the light beam L emitted by the first light source 122 and having a divergence angle $\theta_a$ travels to the grating structure GS, a portion of the light beam L having a smaller divergence angle ($\theta_a \leq \theta_a$), namely a light beam Lb, is able to pass through the light transmissive units 172a. However, a portion of the light beam L having a greater divergence angle ($\theta_a < \theta \leq \theta_b$), namely a light beam La, travels to the light absorbing units 172b and are absorbed by the light absorbing units 172b. Thus, the light beam La is unable to pass through the first light filtering device 172. Alternatively, the light beam Lb does not travel to the light absorbing units 172b. Thus, the light beam Lb is able to pass through the first light filtering device 172. In this embodiment, the first light filtering device 172 absorbs a portion of the light beam L whose divergence angle is greater than the divergence angle $\theta_b$ to make the divergence angle of the light beam L converge. After the light beam L emitted by the first light source 122 passes through the first light filtering device 172, the divergence angle of the light beam L converges from the original divergence angle $\theta_a$ to the divergence angle $\theta_b$. In addition, the divergence angle $\theta_a$ is greater than the divergence angle $\theta_b$. In some embodiments, sizes of the light transmissive units 172a and the light absorbing units 172b may be adjusted based on practical needs, so as to adjust a converging effect of the first light filtering device 172 to the divergence angle of the light beam. The invention does not intend to impose any limitation in this regard.

Referring FIG. 1D as well as FIG. 1B and FIG. 1C, in this embodiment, the first light beam L1 emitted by the first light source 122 and the second light beam L2 emitted by the second light source 124 have substantially the same divergence angle $\theta_1$ in the horizontal direction. The first light filtering device 172 absorbs the portion of the first light beam L1 whose divergence angle is greater than the first angle, so as to make the divergence angle of the first light beam L1 converge. In this embodiment, the first angle is defined as $\theta_2$. Thus, when the light beam L1 emitted by the first light source 122 and having the divergence angle $\theta_1$ passes through the first light filtering device 172 and enters the light entering surface IS, the divergence angle of the first light beam L1 converges and becomes the divergence angle $\theta_2$. Also, the divergence angle $\theta_1$ is greater than the divergence angle $\theta_2$. Alternatively, after the second light beam L2 having the divergence angle $\theta_1$ and emitted by the second light source 124 directly enters the light entering surface IS, the divergence angle of the second light beam L2 is a divergence angle $\theta_3$. Specifically, the divergence angle $\theta_3$ is substantially equal to the divergence angle $\theta_1$, and the divergence angle $\theta_3$ is greater than the divergence angle $\theta_2$. In this embodiment, when the light beam L passes through the light modulating device 130 and enters the light entering surface IS of the light guide plate 110, the divergence angle of the light beam L in the horizontal direction (i.e., in the direction of the first axis X) is close to the divergence angle of the light beam L in the horizontal direction when the light beam L leaves the light emitting surface ES of the light guide plate 110. Thus, in this embodiment, the divergence angle of the first light beam L1 leaving the light guide plate 110 from the light emitting surface ES in the horizontal direction is smaller than the divergence angle of the second light beam L2 leaving the light emitting surface ES of the light guide plate 110 in the horizontal direction.

Referring to FIG. 1B again, in this embodiment, the light emitting devices of the first light source 122 and the light emitting devices of the second light source 124 are alternately arranged along the first direction D1. In addition, the light modulating devices 130 are disposed in correspondence with the light emitting devices of the first light source 122. In this embodiment, the light source module 100 further includes a processing unit 180. The processing unit 180 is adapted to control the light emitting devices of the first light source 122 and the light emitting devices of the second light source 124. For example, the light source module 100 has a normal mode and an anti-spy mode. When the light source module 100 is in the normal mode, the processing unit 180 controls the light emitting devices of the second light source 124 to emit light, and controls the light emitting devices of the first light source 122 not to emit light. The divergence angle $\theta_3$ of the second light beam L2 entering the light guide plate 110 in the horizontal direction is substantially equal to the divergence angle $\theta_1$ in the horizontal direction when the second light beam L2 is emitted from the second light source 124. Thus, the light emitted by the light source module 100 has a divergence angle in the horizontal direction suitable for normal use. In addition, in this embodiment, when the light source module 100 is in the anti-spy mode, the processing unit 180 controls the light emitting devices of the first light source 122 to emit light, and controls the light emitting devices of the second light source 124 not to emit light. The divergence angle $\theta_2$ of the first light beam L1 entering the light guide plate 110 in the horizontal direction is substantially smaller than the divergence angle $\theta_1$ in the horizontal direction when the first light beam L1 is emitted from the first light source 122. Also, the divergence angle $\theta_2$ is smaller than the divergence angle $\theta_3$. Thus, the light emitted by the light source module 100 has a smaller divergence angle in the horizontal direction. In other words, when the user is viewing information by using a relevant product where the light source module 100 is applied, such as a display apparatus of a mobile phone, a display frame of the display apparatus is only viewable by the user within a small range of angle in a direction of the display frame of the display apparatus. In other words, in the anti-spy mode, the user is able to normally view the display frame of the display apparatus. However, when an angle of another person with respect to the display apparatus in the direction of the display frame of the display apparatus exceeds a certain degree, he/she is unable to view the display frame of the display apparatus since the light emitted from the light source module 100 is unable to enter his/her eyes. Thus, the display apparatus has an anti-spy effect.

In this embodiment, based on practical needs, the processing unit 180 may control different light emitting devices of the first light source 122 and the second light source 124 when the light source module 100 is in the normal mode or in the anti-spy mode. For example, the processing unit 180 may control the light emitting devices of the first light source 122 and the light emitting devices of the second light sources 124 to emit light when the light source module 100 is in the normal mode, such that the light emitted by the light source module 100 has a divergence angle in the horizontal direction suitable for normal use. Also, the brightness near the center of a range of light emission of the light source module 100 in the horizontal direction is higher. Moreover, in some embodiments, the first light filtering devices 172 may also be disposed in correspondence with at least a portion of the light emitting devices of the first light source 122, or disposed in correspondence with at least a portion of the light emitting devices of the second light source 124. Accordingly, a different optical effect (e.g., brightness control or control of brightness distribution) or a different outcome of control may be accomplished under the control of the processing unit 180 in different modes.

Figure 2:
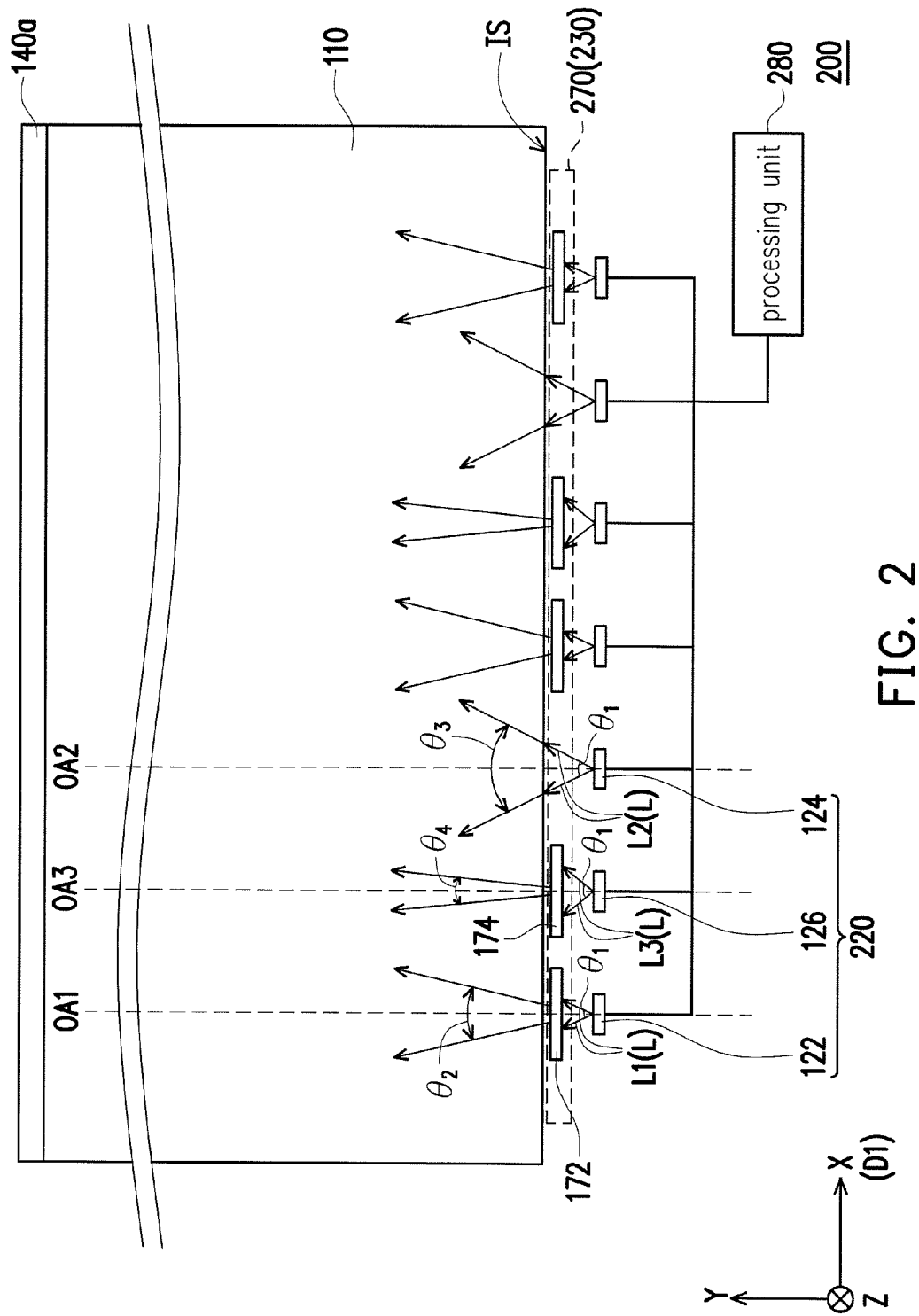
FIG. 2 is a schematic cross-sectional top view illustrating a light source module according to another embodiment of the invention.

FIG. 2 is a schematic cross-sectional top view illustrating a light source module according to another embodiment of the invention. Referring to FIG. 2, in this embodiment, a light source module 200 is similar to the light source module 100 in the embodiment shown in FIG. 1A to FIG. 1D. Components of the light source module 200 and relevant descriptions may be referred to the light source module 100 in the embodiment shown in FIG. 1A and FIG. 1D, and will not be repeated in the following. The light source module 200 differs from the light source 100 in that a light source set 220 of the light source module 200 includes the first light source 122, the second light source 124, and a third light source 126. An optical axis OA3 of the third light source 126 is parallel to the optical axis OA1 of the first light source 122 and the optical axis OA2 of the second light source 124. A light filtering portion 270 of a light modulating device 230 of the light source module 200 includes at least one second light filtering device 174 in addition to the first light filtering device 172. Each second light filtering device 174 is disposed between the light source set 220 and the light guide plate 110. Specifically, the light emitting devices of the first light source 122, the third light source 126, and the second light source 124 are alternately arranged along the first direction D1. The first light filtering devices 172 are disposed in correspondence with the light emitting devices of the first light source 122, and the second light filtering devices 174 are disposed in correspondence with the light emitting devices of the third light source 126. Each first light filtering device 172 absorbs the portion of the first light beam L1 whose divergence angle is greater than the first angle, so as to make the divergence angle of the first light beam L1 converge. In addition, the second light filtering devices 174 absorb portions of light beams emitted by the light emitting devices of the third light source 126 of the light source set 220 whose divergence angle is greater than the second angle. In addition, the second angle is greater than the first angle.

Specifically, in this embodiment, the first angle is defined as $\theta_2$, and the second angle is defined as $\theta_4$. Thus, when the light beam L1 emitted by the first light source 122 and having the divergence angle $\theta_1$ passes through the first light filtering device 172 and enters the light entering surface IS, the divergence angle of the first light beam L1 converges and becomes the divergence angle $\theta_2$. Also, the divergence angle $\theta_1$ is greater than the divergence angle $\theta_2$. When a light beam L3 having the divergence angle $\theta_1$ emitted by the third light source 126 passes through the second light filtering device 174 and enters the light entering surface IS, a divergence angle of the third light beam L3 converges and becomes the divergence angle $\theta_4$. Also, the divergence angle $\theta_1$ is greater than the divergence angle $\theta_4$. Moreover, after the light beam L2 emitted by the second light source 124 and having the divergence angle $\theta_1$ enters the light entering surface IS, the divergence angle of the second light beam L2 is the divergence angle $\theta_3$, and the divergence angle $\theta_3$ is substantially equal to the divergence angle $\theta_1$. In this embodiment, the divergence angle $\theta_4$ is smaller than the divergence angle $\theta_2$, and the divergence angle $\theta_2$ is smaller than the divergence angle $\theta_3$.

In this embodiment, a processing unit 280 of the light source module 200 is adapted to control the light emitting devices of the first light source 122, the light emitting devices of the second light source 124, and the light emitting devices of the third light source 126. Specifically, the first light filtering device 172 of the light modulating device 230 makes the divergence angle of the light beams emitted by the light emitting devices of the first light source converge, and the second light filtering device 174 of the light modulating device 230 makes the divergence angle of the light beams emitted by the light emitting devices of the third light source 126 converge. Thus, the light source module 200 using the light modulating device 230 of this embodiment, like the light source module 100 in the embodiment shown in FIG. 1A to FIG. 1D, may provide the anti-spy effect to a display apparatus. Also, since the extents to which the first light filtering device 172 and the second light filtering device 174 of the light source module 200 make the divergence angles converge are different, a plurality of anti-spying variations at various angles may be accomplished. Furthermore, in some embodiments, the first light filtering devices 172 and the second light filtering devices 174 may be arranged in the first direction D1 in a different way, such that a different optical effect (e.g., brightness control or control of brightness distribution) or a different outcome of control may be accomplished under the control of the processing unit 280 in different modes. Moreover, the light filtering portion 270 of the light modulating device 230 may have different numbers of the first light filtering devices 172 and the second light filtering devices 174 based on practical needs. The invention does not intend to impose any limitation in this regard.

Figure 3:
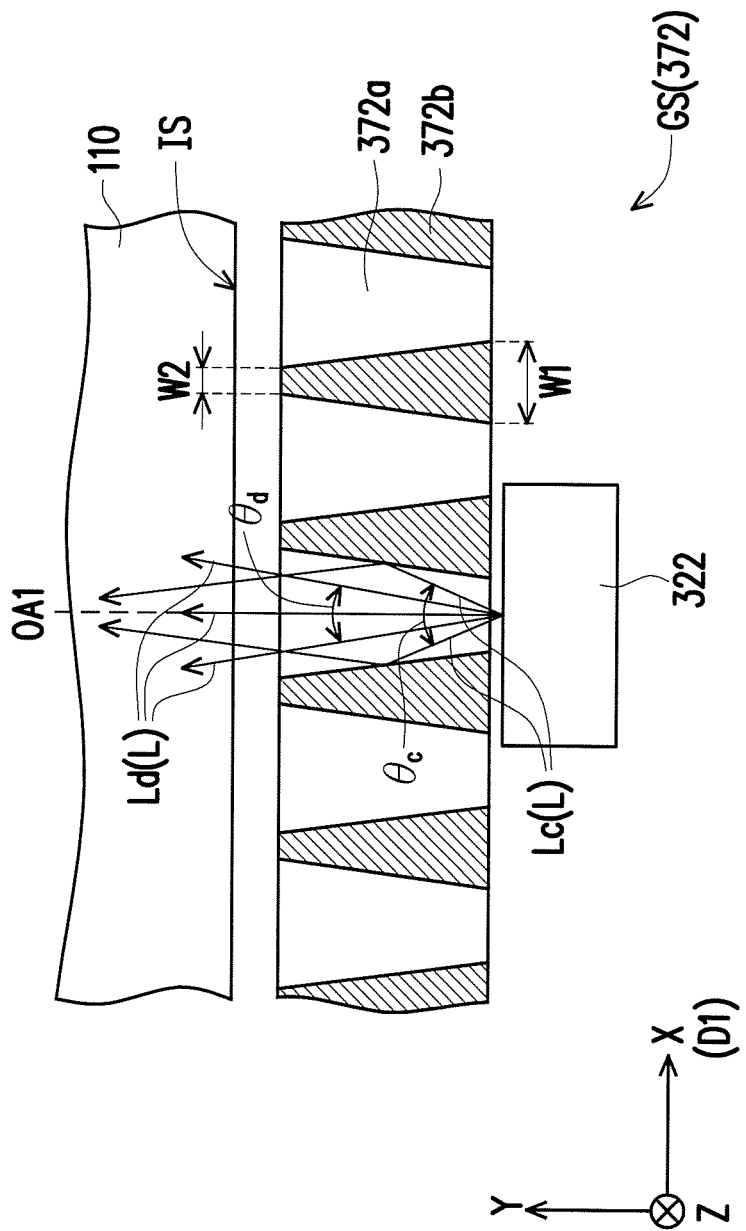
FIG. 3 is a schematic view illustrating a first light filtering device according to yet another embodiment of the invention absorbing a large angular beam.

FIG. 3 is a schematic view illustrating a first light filtering device according to yet another embodiment of the invention absorbing a large angular beam. Referring to FIG. 3, in this embodiment, a first light filtering device 372 is similar to the first light filtering device 172 in the embodiment shown in FIG. 1A to FIG. 1D. Components of the first light filtering device 372 and relevant descriptions may be referred to the first light filtering device 172 in the embodiment shown in FIG. 1A to FIG. 1D, and will not be repeated in the following. The first light filtering device 372 differs from the first light filtering device 172 in that the first light filtering device 372 is the grating structure GS, and the grating structure GS includes a plurality of light transmissive units 372a and a plurality of light absorbing units 372b. The light transmissive units 372a and the light absorbing units 372b are alternately arranged along the first direction D1. In this embodiment, each light absorbing unit 372b has a width W1 in the first direction D1 near a first light source 322, and each light absorbing unit 372b has a width W2 in the first direction D1 near the light entering surface IS of the light guide plate 110. Specifically, the width W1 is greater than the width W2. In other words, since the light transmissive units 372a and the light absorbing units 372b are alternately arranged along the first direction D1, and the width W1 of each light absorbing unit 372b in the first direction D1 near the first light source 322 is greater than the width W2 of each light absorbing unit 372b in the first direction D1 near the light entering surface IS of the light guide plate 110, a width of the light transmissive unit 372a in the first direction D1 near the first light source 322 is smaller than a width of the light transmissive unit 372a in the first direction D1 near the light entering surface IS of the light guide plate 110.

In this embodiment, a refractive index of the light transmissive units 372a is greater than a refractive index of the light absorbing units 372b. When the light beam L emitted by the first light source 322 and having the divergence angle $\theta_c$ travels to the grating structure GS, a portion of the light beam L having a smaller divergence angle ($\theta \leq \theta_d$), namely a light beam Ld, passes through the light transmissive units 372a. The light beam Ld does not pass through the light absorbing units 372b. Moreover, a portion of the light beam L having a greater divergence angle ($\theta_d < \theta \leq \theta_c$), namely a light beam Lc, is totally reflected at an interface between the light transmissive units 372a and the light absorbing units 372b, making a transmission direction of the light beam Lc changed. Specifically, after the total reflection of the light beam Lc at the interface between the light transmissive units 372a and the light absorbing units 372b, a divergence angle of the light beam Lc becomes smaller. When the light beam Lc and the light beam Ld pass through the first light filtering device 372, an overall divergence angle of the light beam Lc and the light beam Ld converges. In this embodiment, after the light beam L emitted by the first light source 322 passes through the first light filtering device 372, the divergence angle of the light beam L converges from the original divergence angle $\theta_c$ to the divergence angle $\theta_d$. In addition, the divergence angle $\theta_c$ is greater than the divergence angle $\theta_d$.

Figure 4:
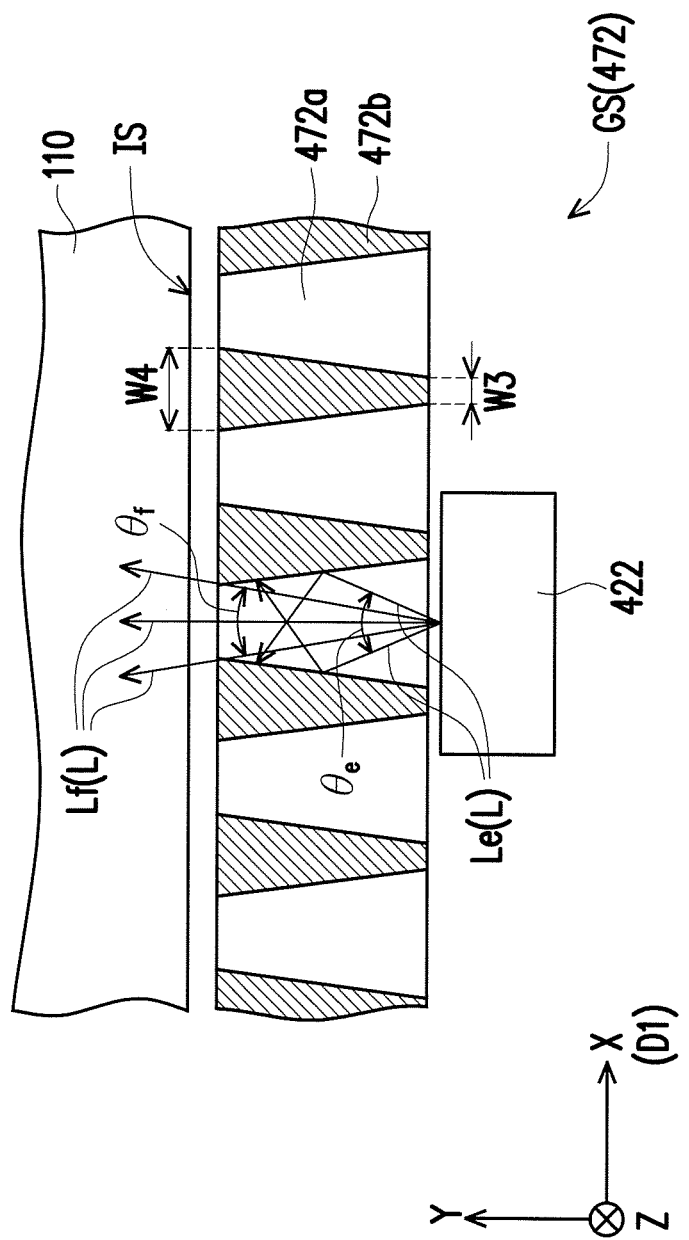
FIG. 4 is a schematic view illustrating a first light filtering device according to still another embodiment of the invention absorbing a large angular beam.

FIG. 4 is a schematic view illustrating a first light filtering device according to still another embodiment of the invention absorbing a large angular beam. Referring to FIG. 4, in this embodiment, a first light filtering device 472 is similar to the first light filtering device 372 in the embodiment shown in FIG. 3. Components of the first light filtering device 472 and relevant descriptions may be referred to the first light filtering device 372 in the embodiment shown in FIG. 3, and will not be repeated in the following. The first light filtering device 472 differs from the first light filtering device 372 in that the first light filtering device 472 is the grating structure GS, and the grating structure GS includes a plurality of light transmissive units 472a and a plurality of light absorbing units 472b. The light transmissive units 472a and the light absorbing units 472b are alternately arranged along the first direction D1. In this embodiment, each light absorbing unit 472b has a width W3 in the first direction D1 near a first light source 422, and each light absorbing unit 472b has a width W4 in the first direction D1 near the light entering surface IS of the light guide plate 110. Specifically, the width W4 is greater than the width W3. In other words, since the light transmissive units 472a and the light absorbing units 472b are alternately arranged along the first direction D1, and the width W4 of each light absorbing unit 472b in the first direction D1 near the light entering surface IS of the light guide plate 110 is greater than the width W3 of each light absorbing unit 472b in the first direction D1 near the first light source 422, a width of the light transmissive unit 472a in the first direction D1 near the first light source 422 is greater than a width of the light transmissive unit 472a in the first direction D1 near the light entering surface IS of the light guide plate 110.

In this embodiment, a refractive index of the light transmissive units 472a is greater than a refractive index of the light absorbing units 472b. When the light beam L emitted by the first light source 422 and having a divergence angle θ, travels to the grating structure GS, a portion of the light beam L having a smaller divergence angle ($\theta \le \theta_f$), namely a light beam Lf, passes through the light transmissive units 472a. The light beam Lf does not pass through the light absorbing units 472b. Moreover, a portion of the light beam L having a greater divergence angle ($\theta_f < \theta \le \theta_c$), namely a light beam Le, is absorbed by the light absorbing units 472b after multiple reflections at an interface between the light transmissive units 472a and the light absorbing units 472b, and is thus unable to pass through the first light filtering device 472. In this embodiment, after the light beam L emitted by the first light source 422 passes through the first light filtering device 472, the divergence angle of the light beam L converges from the original divergence angle $\theta_e$ to the divergence angle $\theta_f$. In addition, the divergence angle $\theta_e$ is greater than the divergence angle $\theta_f$.

Figure 5:
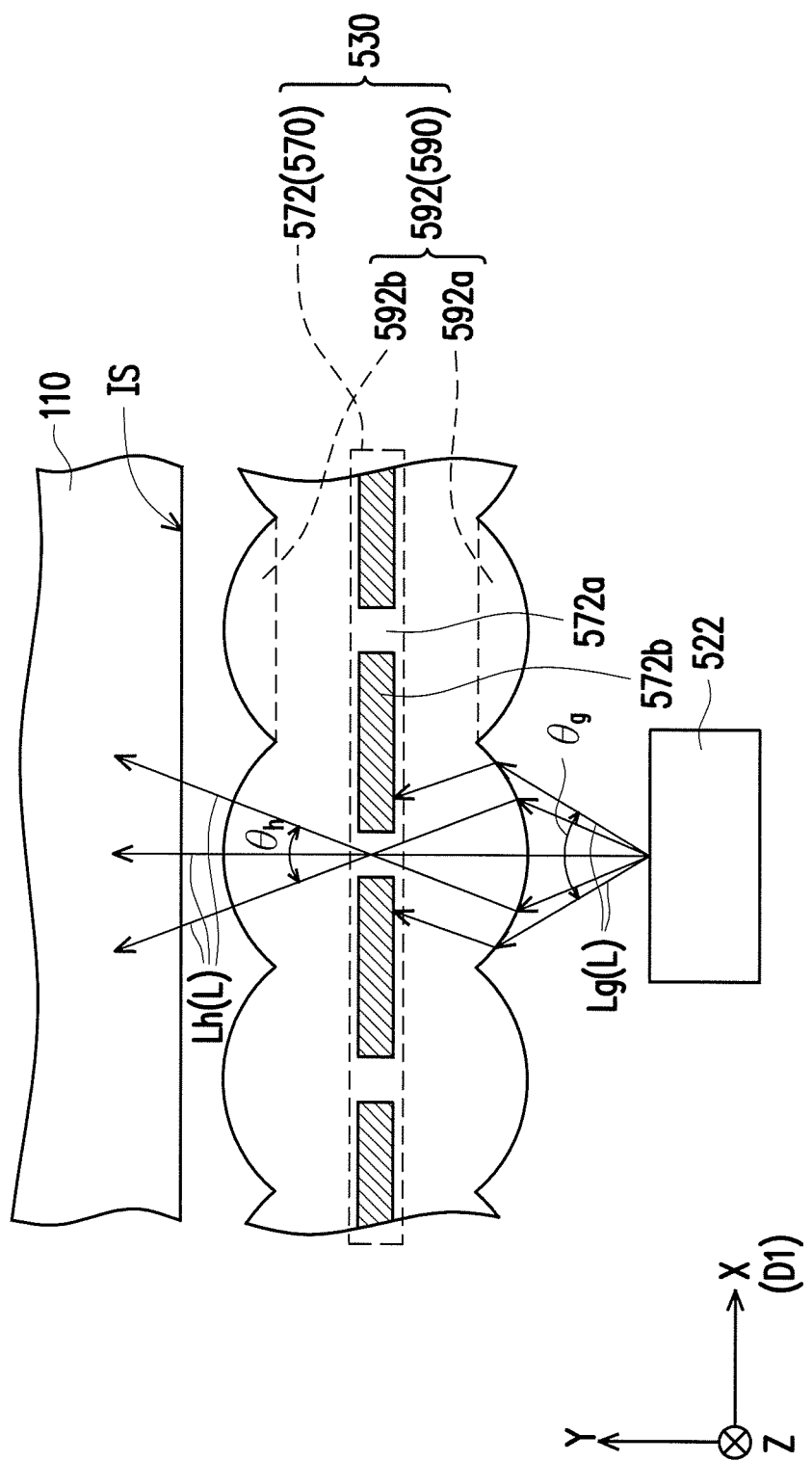
FIG. 5 is a schematic view illustrating a light modulating device according to another embodiment of the invention making a divergence angle of a light beam converge.

FIG. 5 is a schematic view illustrating a light modulating device according to another embodiment of the invention making a divergence angle of a light beam converged. Referring to FIG. 5, in this embodiment, a light modulating device 530 is similar to the light modulating device 130 in the embodiment shown in FIG. 1A to FIG. 1D. Components of the light modulating device 530 and relevant descriptions may be referred to the light modulating device 130 in the embodiment shown in FIG. 1A to FIG. 1D, and will not be repeated in the following. The light modulating device 530 differs from the light modulating device 130 in that the light modulating device 530 includes a light filtering portion 570 and a light refracting portion 590. The light refracting portion 590 is disposed between the first light source 522 and the light filtering portion 570. In this embodiment, the light filtering portion 570 includes at least one first light filtering device 572. The first light filtering device 572 is a grating structure, and the grating structure includes a plurality of light absorbing units 572b arranged intermittently along the first direction D1 and in parallel. Specifically, the grating structure further includes a plurality of light transmissive units 572a, and the light transmissive units 572a and the light absorbing units 572b are alternately arranged along the first direction D1. In this embodiment, the light transmissive units 572a may be, for example, holes or gaps between the light absorbing units 572b. However, the invention is not limited thereto. In addition, in this embodiment, a light refracting portion 590 includes at least one lens structure 592, and the lens structure 592 includes a plurality of micro-lenses arranged along the first direction D1. Specifically, the light refracting portion 590 includes one lens structure 592 disposed between the light filtering portion 570 and the first light source 522. Also, the light refracting portion 590 includes another lens structure 592 disposed between the light filtering portion 570 and the light guide plate 110. The lens structure 592 disposed between the light filtering portion 570 and the first light source 522 includes a plurality of first micro-lenses 592a arranged along the first direction D1, and the lens structure 592 disposed between the light filtering portion 570 and the light guide plate 110 includes a plurality of second micro-lenses 592b arranged along the first direction D1. In this embodiment, each first micro-lens 592a is disposed in correspondence with a gap (i.e., the light transmissive unit 572a) between adjacent light absorbing units 572b, and each second micro-lens 592b is also disposed in correspondence with a gap (i.e., the light transmissive unit 572a) between adjacent light absorbing units 572b.

In this embodiment, when the light beam L emitted by the first light source 522 and having a divergence angle $\theta_g$ travels to the light modulating device 530, a portion of the light beam L having a smaller divergence angle, namely a light beam Lh, is refracted and concentrated by the first micro-lens 592a and passes through the gap between the adjacent light absorbing units 572b, and then refracted and emitted by the second micro-lens 592b. Namely, the light beam Lh does not pass through the light absorbing units 572b. Moreover, a portion of the light beam L having a greater divergence angle, namely a light beam Lg, is blocked by the light absorbing units 572b after being refracted at the first micro-lens 592a and entering the first micro-lens 592a. Specifically, when the light beam Lg and the light beam Lh pass through the first light filtering device 530, an overall divergence angle of the light beam Lg and the light beam Lh converges. In this embodiment, after the light beam L emitted by the first light source 522 passes through the light modulating device 530, the divergence angle of the light beam L converges from the original divergence angle $\theta_g$ to the divergence angle $\theta_h$. In addition, the divergence angle $\theta_g$ is greater than the divergence angle $\theta_h$.

Figure 6:
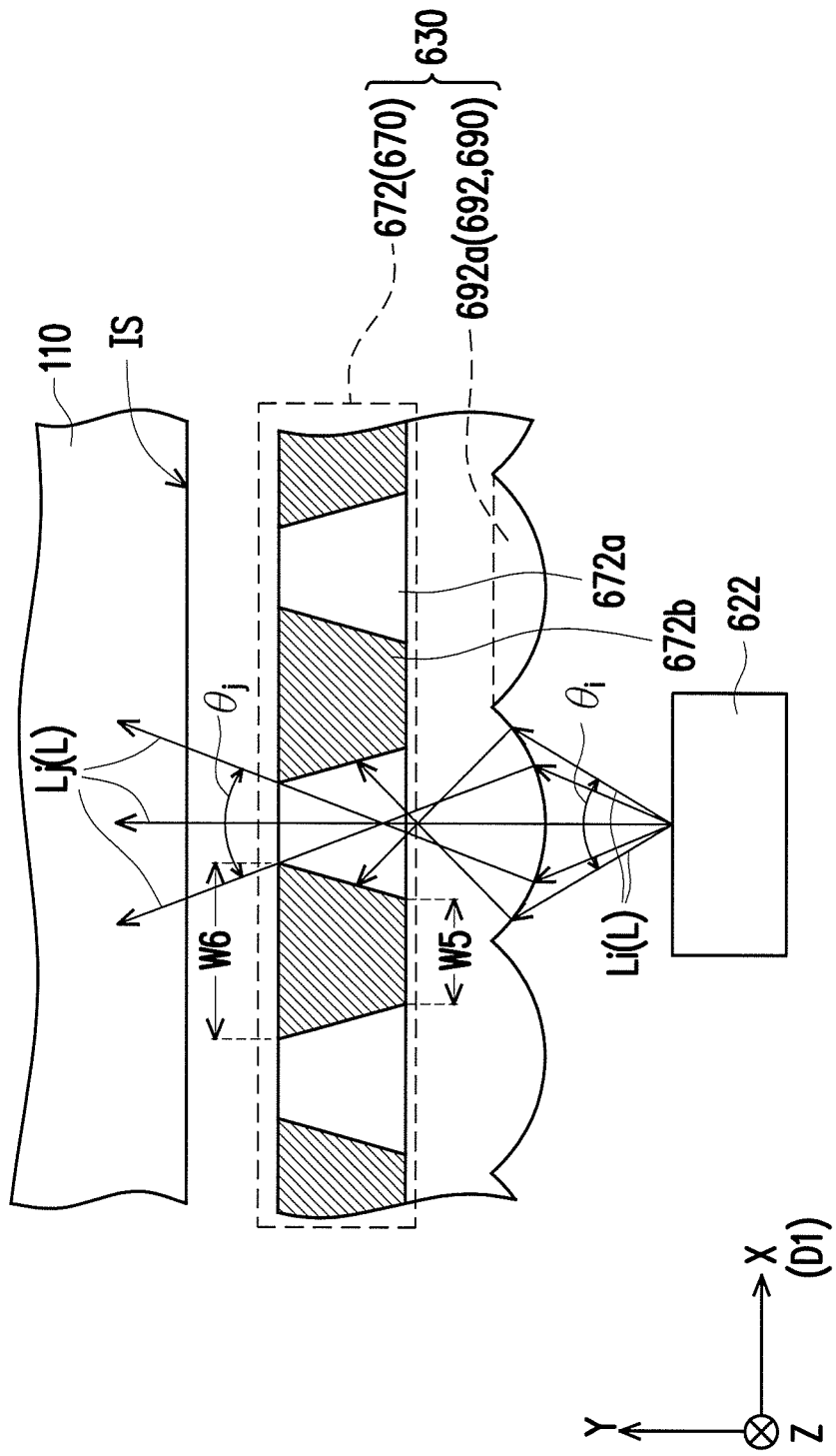
FIG. 6 is a schematic view illustrating a light modulating device according to yet another embodiment of the invention making a divergence angle of a light beam converge.

FIG. 6 is a schematic view illustrating a light modulating device according to yet another embodiment of the invention making a divergence angle of a light beam converge. Referring to FIG. 6, in this embodiment, a light modulating device 630 is similar to the light modulating device 530 in the embodiment shown in FIG. 5. Components of the light modulating device 630 and relevant descriptions may be referred to the light modulating device 530 in the embodiment shown in FIG. 5, and will not be repeated in the following. The light modulating device 630 differs from the light modulating device 530 in that the light modulating device 630 includes a light filtering portion 670 and a light refracting portion 690. The light refracting portion 690 is disposed between the first light source 622 and the light filtering portion 670. In this embodiment, the light filtering portion 670 includes at least one first light filtering device 672. The first light filtering device 672 is a grating structure, and the grating structure includes a plurality of light transmissive units 672a and a plurality of light absorbing units 672b. The light transmissive units 672a and the light absorbing units 672b are alternately arranged along the first direction D1. Specifically, each light absorbing unit 672b has a width W5 in the first direction D1 near the first light source 622, and each light absorbing unit 672b has a width W6 in the first direction D1 near the light entering surface IS of the light guide plate 110. In addition, the width W6 is greater than the width W5. In addition, in this embodiment, the light refracting portion 690 includes a lens structure 692 disposed between the light filtering portion 670 and the first light source 622. The lens structure 692 includes a plurality of first micro-lenses 692a arranged along the first direction D1. In this embodiment, each first micro-lens 692a corresponds to one of the light transmissive units 672a.

In this embodiment, when the light beam L emitted by the first light source 622 and having a divergence angle $\theta_i$ travels to the light modulating device 630, a portion of the light beam L having a smaller divergence angle, namely a light beam Lj, sequentially passes through the first micro-lens 692a and the light transmissive unit 672a. The light beam Lj does not pass through the light absorbing units 672b. Moreover, a portion of the light beam L having a greater divergence angle, namely a light beam Li, is refracted at the first micro-lens 692a and enters the first micro-lens 692a. Then the light beam Li enters the light transmissive units 672a. After multiple reflections at an interface between the light transmissive units 672a and the light absorbing units 672b, the light beam Li is absorbed by the light absorbing units 672b and unable to pass through the first light filtering device 672. In this embodiment, after the light beam L emitted by the first light source 622 passes through the light modulating device 630, the divergence angle of the light beam L converges from the original divergence angle $\theta_i$ to the divergence angle $\theta_j$. In addition, the divergence angle $\theta_i$ is greater than the divergence angle $\theta_j$.

Figure 7:
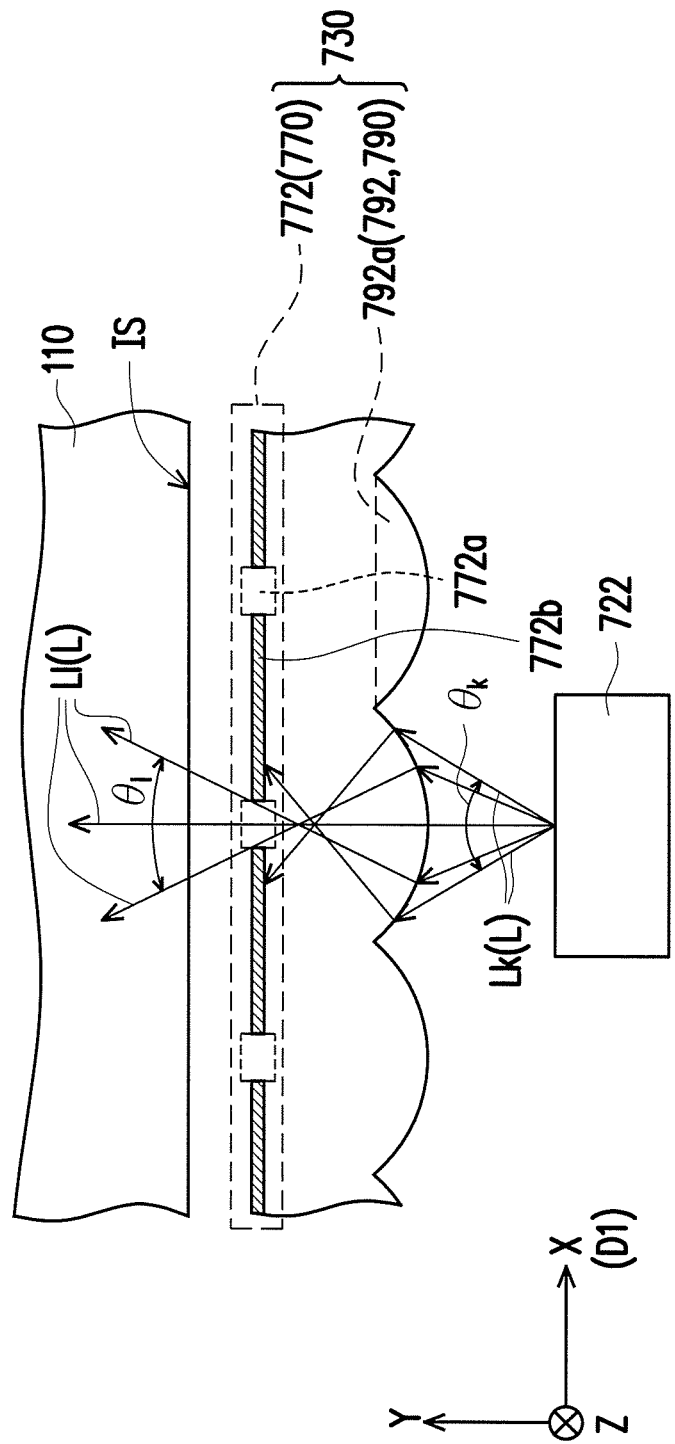
FIG. 7 is a schematic view illustrating a light modulating device according to still another embodiment of the invention making a divergence angle of a light beam converge.

FIG. 7 is a schematic view illustrating a light modulating device according to still another embodiment of the invention making a divergence angle of a light beam converge. Referring to FIG. 7, in this embodiment, a light modulating device 730 is similar to the light modulating device 630 in the embodiment shown in FIG. 6. Components of the light modulating device 730 and relevant descriptions may be referred to the light modulating device 630 in the embodiment shown in FIG. 6, and will not be repeated in the following. The light modulating device 730 differs from the light modulating device 630 in that the light modulating device 730 includes a light filtering portion 770 and a light refracting portion 790. The light refracting portion 790 is disposed between the first light source 722 and the light filtering portion 770. In this embodiment, the light filtering portion 770 includes at least one first light filtering device 772. The first light filtering device 772 is a grating structure, and the grating structure includes a plurality of light transmissive units 772a and a plurality of light absorbing units 772b. The light transmissive units 772a and the light absorbing units 772b are alternately arranged along the first direction D1. The light transmissive units 772a may be, for example, holes between the light absorbing units 772b. However, the invention is not limited thereto. The lens structure 792 includes a plurality of first micro-lenses 792a arranged along the first direction D1. In this embodiment, each first micro-lens 792a corresponds to one of the light transmissive units 772a.

In this embodiment, when the light beam L emitted by the first light source 722 and having a divergence angle $\theta_k$ travels to the light modulating device 730, a portion of the light beam L having a smaller divergence angle, namely a light beam L1, sequentially passes through the first micro-lens 792a and the light transmissive unit 772a. The light beam L1 does not pass through the light absorbing units 772b. Moreover, a portion of the light beam L having a greater divergence angle, namely a light beam Lk, is blocked by the light absorbing units 772b after being refracted at the first micro-lens 792a and entering the first micro-lens 792a. Specifically, when the light beam Lk and the light beam L1 pass through the first light filtering device 730, an overall divergence angle of the light beam Lk and the light beam L1 converges. In this embodiment, after the light beam L emitted by the first light source 722 passes through the light modulating device 730, the divergence angle of the light beam L converges from the original divergence angle $\theta_k$ to the divergence angle $\theta_i$. In addition, the divergence angle $\theta_k$ is greater than the divergence angle $\theta_i$.

Figure 8:
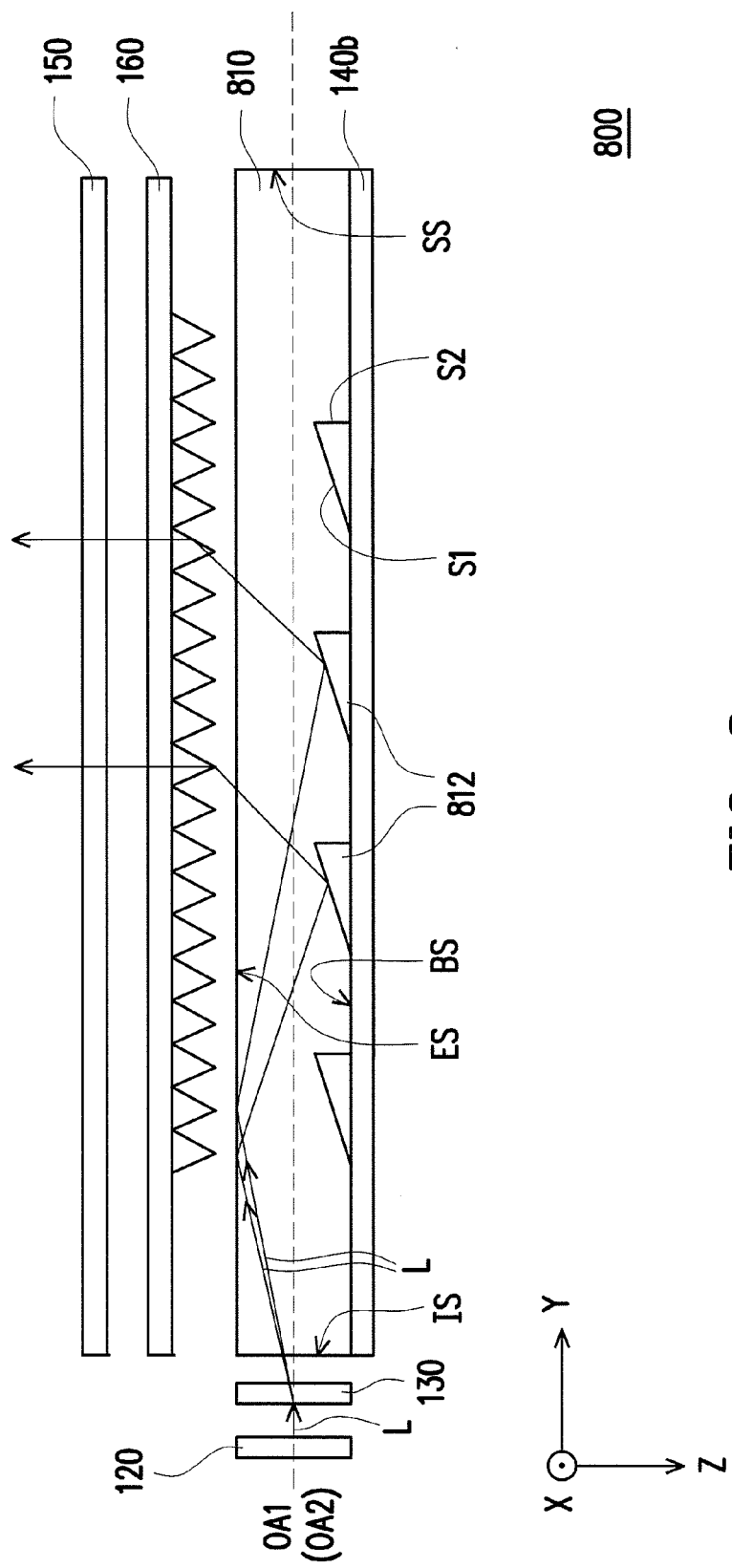
FIG. 8 is a schematic cross-sectional side view illustrating a light source module according to another embodiment of the invention.

FIG. 8 is a schematic cross-sectional side view illustrating a light source module according to another embodiment of the invention. Referring to FIG. 8, in this embodiment, a light source module 800 is similar to the light source module 100 in the embodiment shown in FIGS. 1A to 1D. Components of the light source module 800 and relevant descriptions may be referred to the light source module 100 in the embodiment shown in FIG. 1A and FIG. 1D, and will not be repeated in the following. The light source module 800 differs from the light source module 100 in that a plurality of micro-structures 812 are disposed on the bottom surface BS of a light guide plate 810 of the light source module 800. In addition, the light guide plate 810 has a consistent thickness. In this embodiment, the light beam L from the light entering surface IS is transmitted in the light guide plate 810 through total reflection. When the light beam L is transmitted to the micro-structures 812, the light beam L may be reflected at the micro-structures 812 and refracted out of the light guide plate 810 at the light emitting surface ES. Specifically, each micro-structure 812 is a recessed structure recessed inwardly in the bottom surface BS of the light guide plate 510. Each micro-structure 812 has a first surface S1 facing the light emitting surface IS and a second surface S2 facing the side surface SS. In addition, the first surface S1 and the second surface S2 are flat surfaces. Since the first surfaces S1 and the second surfaces S2 of the micro-structures 812 are flat surfaces, the micro-structures 812 do not cause scattering of light. In this embodiment, the divergence angle of the light beam L entering the light entering surface IS through the light modulating device 130 in the horizontal direction (i.e., in the direction of the first axis X) is close to the divergence angle of the light beam L leaving the light emitting surface ES in the horizontal direction. Moreover, since the light modulating device 130 converges the divergence angle of the first light beam (not shown) emitted by the light emitting device of the first light source (not shown), the light source module 800, like the light source module 100 in the embodiment shown in FIGS. 1A to 1D, provides the anti-spy effect to the display apparatus.

Figure 9:
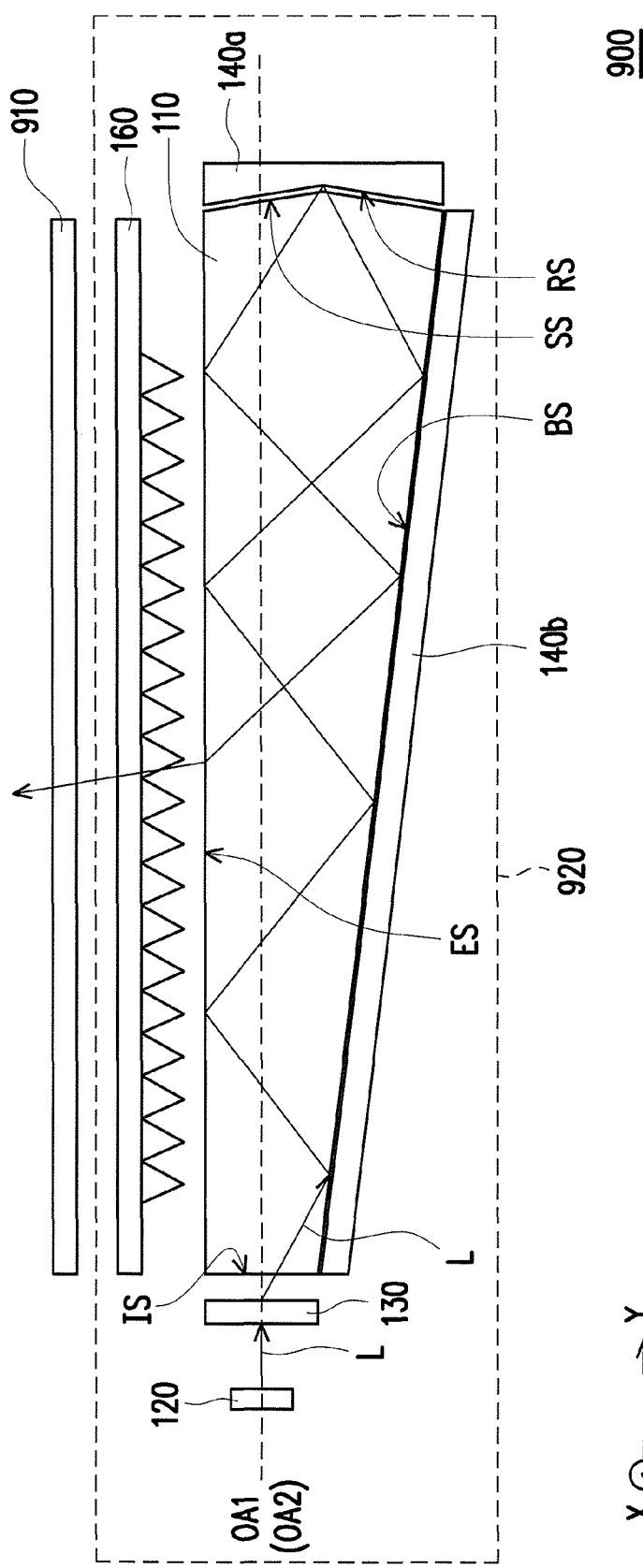
FIG. 9 is a schematic cross-sectional side view illustrating a display apparatus according to an embodiment of the invention.

FIG. 9 is a schematic cross-sectional side view illustrating a display apparatus according to an embodiment of the invention. Referring to FIG. 9, a display apparatus 900 includes a display panel 910 and a light source module 920. The light source module 920 is adapted to provide the light beam L to the display panel 910. Specifically, the light source module 920 is similar to the light source module 100 in the embodiment shown in FIG. 1A to FIG. 1D. Components of the light source module 920 and relevant descriptions may be referred to the light source module 100 in the embodiment shown in FIG. 1A and FIG. 1D, and will not be repeated in the following. In this embodiment, the display panel 910 is a transmissive display panel or other types of display panel, for example. Also, at least the light source module 100 in the embodiment shown in FIG. 1A to FIG. 1D, the light source module 200 in the embodiment shown in FIG. 2, the light source module 800 in the embodiment shown in FIG. 8, or other types of light source module may also be used as the light source module 920. The invention does not intend to impose any limitation in this regard. In this embodiment, since the light modulating device 130 converges the divergence angle of the first light beam (not shown) emitted by the light emitting device of the first light source (not shown), the light source module 920, like the light source module 100 in the embodiment shown in FIGS. 1A to 1D, may provide the display apparatus 900 with the anti-spy effect.

In view of the foregoing, the embodiments of the invention at least have one of the following characteristics or effects. In the light source module and the display apparatus according to the embodiments of the invention, the light modulating device includes the light filtering portion. The first light beam emitted by the light source set enters the light entering surface of the light guide plate through the light modulating device, and the light modulating device converges the divergence angle of the first light. Thus, the light source module according to the embodiments of the invention provides the anti-spy effect to a display apparatus.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module, comprising:
a light guide plate, comprising a light entering surface;
a light source set, disposed beside the light entering surface, wherein the light source set is adapted to emit a first light beam; and
a light modulating device, disposed between the light source set and the light guide plate and comprising a light filtering portion,
wherein the first light beam passes through the light modulating device and enters the light entering surface, and the light modulating device makes a divergence angle of the first light beam converge,
wherein the light source set comprises a first light source and a second light source, the first light source is adapted to emit a first light beam, the second light source is adapted to emit a second light beam, the light modulating device is disposed in correspondence with the first light source, and the second light beam directly enters the light entering surface after the second light beam leaves the second light source.

2. The light source module as claimed in claim 1, wherein the light filtering portion comprises at least one first light filtering device, the first light filtering device filters out a portion of the first light beam whose divergence angle is greater than a first angle to make the divergence angle of the first light beam converge.

3. The light source module as claimed in claim 2, wherein the light filtering portion further comprises at least one second light filtering device, the second light filtering device is disposed between the light source set and the light guide plate, and the second light filtering device filters out a portion of a light beam emitted by the light source set whose divergence angle is greater than a second angle, wherein the second angle is smaller than the first angle.

4. The light source module as claimed in claim 2, wherein the first light filtering device is a grating structure, the grating structure comprises a plurality of light absorbing units arranged intermittently along a first direction and in parallel, a material of the light absorbing units comprises a light absorbing material, and the first direction is perpendicular to a direction of an optical axis of the light source set.

5. The light source module as claimed in claim 4, wherein a width of each of the light absorbing units in the first direction near the light source set is greater than a width of each of the light absorbing units in the first direction near the light entering surface.

6. The light source module as claimed in claim 4, wherein a width of each of the light absorbing units in the first direction near the light entering surface is greater than a width of each of the light absorbing units in the first direction near the light source set.

7. The light source module as claimed in claim 1, wherein the light modulating device comprises the light filtering portion and a light refracting portion, and the light refracting portion is disposed between the light source set and the light filtering portion.

8. The light source module as claimed in claim 7, wherein the light filtering portion comprises at least one first light filtering device, the first light filtering device is a grating structure comprising a plurality of light absorbing units arranged intermittently along a first direction and in parallel, the light refracting device comprises at least one lens structure, the lens structure comprises a plurality of microlenses arranged along the first direction, each of the microlenses is disposed in correspondence with a gap between adjacent light absorbing units, a material of the light absorbing units comprises a light absorbing material, and the first direction is perpendicular to an optical axis of the light source set.

9. The light source module as claimed in claim 8, wherein the at least one lens structure comprises a plurality of lens structures, a portion of the lens structures is disposed between the light filtering portion and the light source set, and another portion of the lens structure is disposed between the light filtering portion and the light guide plate.

10. The light source module as claimed in claim 8, wherein an end of each of the light absorbing units facing the light source set has a first width in the first direction, an end of each of the light absorbing units facing the light guide plate has a second width, and the second width is greater than the first width.

11. A display apparatus, comprising:
a display panel; and
a light source module, adapted to provide light to the display panel, wherein the light source module comprises:
 a light guide plate, comprising a light entering surface;
 a light source set, disposed beside the light entering surface, wherein the light source set is adapted to emit a first light beam; and
 a light modulating device, disposed between the light source set and the light guide plate and comprising a light filtering portion,
 wherein the first light beam passes through the light modulating device and enters the light entering surface, and the light modulating device makes a divergence angle of the first light beam converge,
 wherein the light source set comprises a first light source and a second light source, the first light source is adapted to emit a first light beam, the second light source is adapted to emit a second light beam, the light modulating device is disposed in correspondence with the first light source, and the second light beam directly enters the light entering surface after the second light beam leaves the second light source.

12. A light source module, comprising:
a light guide plate, comprising a light entering surface;
a light source set, disposed beside the light entering surface, wherein the light source set is adapted to emit a first light beam; and
a light modulating device, disposed between the light source set and the light guide plate and comprising a light filtering portion and a light refracting portion, wherein the light refracting portion is disposed between the light source set and the light filtering portion,
wherein the first light beam passes through the light modulating device and enters the light entering surface, and the light modulating device makes a divergence angle of the first light beam converge.

13. A display apparatus, comprising:
a display panel; and
a light source module, adapted to provide light to the display panel, wherein the light source module comprises:
 a light guide plate, comprising a light entering surface;
 a light source set, disposed beside the light entering surface, wherein the light source set is adapted to emit a first light beam; and
 a light modulating device, disposed between the light source set and the light guide plate and comprising a light filtering portion and a light refracting portion, wherein the light refracting portion is disposed between the light source set and the light filtering portion,
 wherein the first light beam passes through the light modulating device and enters the light entering surface, and the light modulating device makes a divergence angle of the first light beam converge.

14. A light source module, comprising:
a light guide plate, comprising a light entering surface;
a light source set, disposed beside the light entering surface, wherein the light source set is adapted to emit a first light beam; and
a light modulating device, disposed between the light source set and the light guide plate and comprising a light filtering portion,
wherein the first light beam passes through the light modulating device and enters the light entering surface, and the light modulating device makes a divergence angle of the first light beam converge,
wherein the light filtering portion comprises at least one first light filtering device, the first light filtering device filters out a portion of the first light beam whose divergence angle is greater than a first angle to make the divergence angle of the first light beam converge.

15. The light source module as claimed in claim 14, wherein the light filtering portion further comprises at least one second light filtering device, the second light filtering device is disposed between the light source set and the light guide plate, and the second light filtering device filters out a portion of a light beam emitted by the light source set whose divergence angle is greater than a second angle, wherein the second angle is smaller than the first angle.

16. The light source module as claimed in claim 14, wherein the first light filtering device is a grating structure, the grating structure comprises a plurality of light absorbing units arranged intermittently along a first direction and in parallel, a material of the light absorbing units comprises a light absorbing material, and the first direction is perpendicular to a direction of an optical axis of the light source set.

17. The light source module as claimed in claim 16, wherein a width of each of the light absorbing units in the first direction near the light source set is greater than a width of each of the light absorbing units in the first direction near the light entering surface.

18. The light source module as claimed in claim 16, wherein a width of each of the light absorbing units in the first direction near the light entering surface is greater than a width of each of the light absorbing units in the first direction near the light source set.

19. A display apparatus, comprising:
a display panel; and
a light source module, adapted to provide light to the display panel, wherein the light source module comprises:
 a light guide plate, comprising a light entering surface;
 a light source set, disposed beside the light entering surface, wherein the light source set is adapted to emit a first light beam; and
 a light modulating device, disposed between the light source set and the light guide plate and comprising a light filtering portion,
 wherein the first light beam passes through the light modulating device and enters the light entering surface, and the light modulating device makes a divergence angle of the first light beam converge,
 wherein the light filtering portion comprises at least one first light filtering device, the first light filtering device filters out a portion of the first light beam whose divergence angle is greater than a first angle to make the divergence angle of the first light beam converge.

* * * * *